United States Patent
Delblanc-Bauer et al.

(10) Patent No.: US 6,174,386 B1
(45) Date of Patent: Jan. 16, 2001

(54) NAOH EVAPORATOR COMPRISING AT LEAST ONE COMPONENT FORMED BY A HIGH STRENGTH STAINLESS STEEL

(75) Inventors: Anna Delblanc-Bauer; Pasi Kangas, both of Sandviken; Magnus Nyström, Gävle, all of (SE)

(73) Assignee: Sandvik AB, Sandviken (SE)

( * ) Notice: Under 35 U.S.C. 154(b), the term of this patent shall be extended for 0 days.

(21) Appl. No.: 09/249,048

(22) Filed: Feb. 12, 1999

(30) Foreign Application Priority Data

Feb. 18, 1998 (SE) .................................................. 9800466

(51) Int. Cl.$^7$ .................................................. C22C 38/44
(52) U.S. Cl. ............................................. 148/325; 148/327
(58) Field of Search .................................. 148/325, 327; 420/52

(56) References Cited

U.S. PATENT DOCUMENTS

| | | |
|---|---|---|
| 4,060,389 | 11/1977 | Nishimura et al. . |
| 4,715,908 | 12/1987 | Churchill . |
| 5,582,656 | 12/1996 | Kangas et al. . |

FOREIGN PATENT DOCUMENTS

| | | |
|---|---|---|
| 371 399 | 6/1983 | (AT) . |
| 156 778 | 10/1985 | (EP) . |
| 455 625 | 11/1991 | (EP) . |
| 0 659 896 | 6/1995 | (EP) . |
| 6-116684 | 4/1984 | (JP) . |
| 1-056855 | 3/1989 | (JP) . |
| 3-146641 | 6/1991 | (JP) . |
| WO95/00674 | 1/1995 | (WO) . |

*Primary Examiner*—Deborah Yee
(74) *Attorney, Agent, or Firm*—Burns, Doane, Swecker & Mathis, L.L.P.

(57) ABSTRACT

The invention relates to the use of a ferritic-austenitic stainless steel alloy as construction material for components in the process industry, which components can be foreseen to come into direct contact with caustic soda.

1 Claim, 1 Drawing Sheet

NAOH EVAPORATOR COMPRISING AT LEAST ONE COMPONENT FORMED BY A HIGH STRENGTH STAINLESS STEEL

BACKGROUND OF THE INVENTION

The present invention relates to the use of a high strength stainless construction steel for making of components for the process industry, especially components intended to be exposed to caustic soda. As these materials are applicable to various forms of equipment used in applications where exposure to caustic soda is found, they are hereinafter called "construction material" which should be understood to mean tube, sheet, bar or any other form the material may take in that environment.

Ferritic-austenitic (duplex) stainless steels are today widely used as construction material in a number of industrial applications. The duplex steel, which is described in U.S. Pat. No. 5,582,656 (the content of which is hereby incorporated by reference) and characterized in having a composition comprising 28–35% Cr, 3–10% Ni, 1.0–4.0 Mo and 0.2–0.6% N, has been found to have especially favorable and in some cases surprisingly good properties as a construction material in specific applications. The present invention relates to the use of the steel grade as a construction material within areas where sodium hydroxide (NaOH) and solutions thereof are used or prepared, and where especially favorable properties have been achieved. The alloy according to U.S. Pat. No. 5,582,656 is identified by the trademark SAF 2906 and preferably contains 29–33% Cr, 3–7% Ni and 1–3% Mo.

High corrosion rates can arise when steel and also other metal such as titanium, are exposed to NaOH. In solutions with 30–48% NaOH, and at temperatures between 100 and 200° C., the corrosion rate of chromium steels diminishes with increasing chromium content of 24% and above. The corrosion rate of chromium steel can also be reduced by the addition of sodium chlorate ($NaClO_3$) which has been proved for instance for 48% NaOH and a chromium content of at least 5% in the chromium steel, and an addition of 0–1% $NaClO_3$.

When using austenitic stainless steels in solutions containing NaOH, there exists, apart from high corrosion rates, also a great risk of stress corrosion cracking, which risk diminishes with an increasing amount of nickel in the material.

Caustic soda is produced, among other methods, by the electrolysis of sodium chloride solutions, whereby also chlorine gas is produced. When the diaphragm method is used, the achieved sodium hydroxide has a concentration of about 12% after the electrolysis and it contains also chlorides and in some cases chlorate. The concentration of the solution is increased by evaporation in several steps in so called NaOH evaporators. The solution is heated in these evaporaators under pressure, steam evaporates and chlorides are removed (after crystallization). The concentration of NaOH reaches up to 47% and higher in the last evaporation steps. In spite of the fact that chlorides have been removed in several steps remaining amounts of both solid (up to 8%) and dissolved chloride (up to 7%) have been shown The temperature in the NaOH evaporators with the highest NaOH concentration is 160–170° C.

The corrosion rates in a NaOH evaporator can vary greatly, above all depending-on temperature and flow rates. The temperature, variations in the same part of an apparatus, for instance, an evaporator tube or a wear plate, can cause so high corrosion rates locally that an unacceptable low length of life is achieved while at the same time as the major part of the material only shows insignificant corrosion. At the normally occurring temperature differences, inside for instance a NaOH evaporator tube, or at temperature alteration in connection with process changes, materials which have previously shown good length of life can therefore show high corrosion rates, which result in a substantially reduced length of life for the material.

Especially high flow rates exist, apart from inside the evaporator tubes, also at the propeller of the circulation pump and at the air diffuser. These parts therefore runs the risk of being exposed to erosion corrosion, which is further aggravated with increasing amounts of undissolved salt in the solution, and consequently show high corrosion rates. Several materials, which have been used in the construction of NaOH evaporators, have in many cases, an unacceptable low length of life in these exposed parts.

The materials that now dominate in construction of NaOH evaporators are 26-1 (UNS S44626), Nickel 200 (UNS N02200) and Sanicro 28 (UNS N08028). Certain problems with high corrosion rates and erosion corrosion exist however, which lead to shortened life of length of the construction. Nickel 200, which essentially contains 0.15 C (max), 99 Ni, 0.10 Cu (max) and 0.20 Mg (max), is today the dominating choice of material thanks to its high resistance to corrosion by the process solution in NaOH evaporation. Tests with Sanicro 28 have been done, but the material has a limited length of life due to corrosion.

Nickel 200 has however the limitation that its erosion resistance is reduced compared to stainless steels as Sanicro 28. The combination of high erosion resistance and at the same time high resistance to the process solution in NaOH evaporation would therefore be optimal.

OBJECTS AND SUMMARY OF THE INVENTION

It is an object of this invention to avoid or alleviate the problems of the prior art.

It is further an object of this invention to provide a high strength stainless construction steel for making of components for the process industry.

It is an aspect of the invention to provide in the use of construction materials as process chemistry components to be used in caustic soda environments, the improvement which at least of the portion of the components is made of a ferritic-austenitic stainless steel alloy consisting essentially of, in weight-%:

| | |
|---|---|
| C | max 0.05 |
| Si | max 0.8 |
| Mn | 0.3–4 |
| Cr | 28–35 |
| Ni | 3–10 |
| Mo | 1.0–4.0 |
| N | 0.2–0.6 |
| Cu | max 1.0 |
| W | max 2.0 |
| S | max 0.010 |
| Ce | max 0.2 | and the rest Fe with normally occurring impurities and additions and wherein the ferrite content is 30–70 volume-%, balance austenite.

BRIEF DESCRIPTION OF THE DRAWINGS

The Figure shows tests results which include corrosion testing of different materials in boiling NaOH at different concentrations.

DETAILED DESCRIPTION OF THE PREFERRED EMBODIMENTS OF THE INVENTION

Figure 1:
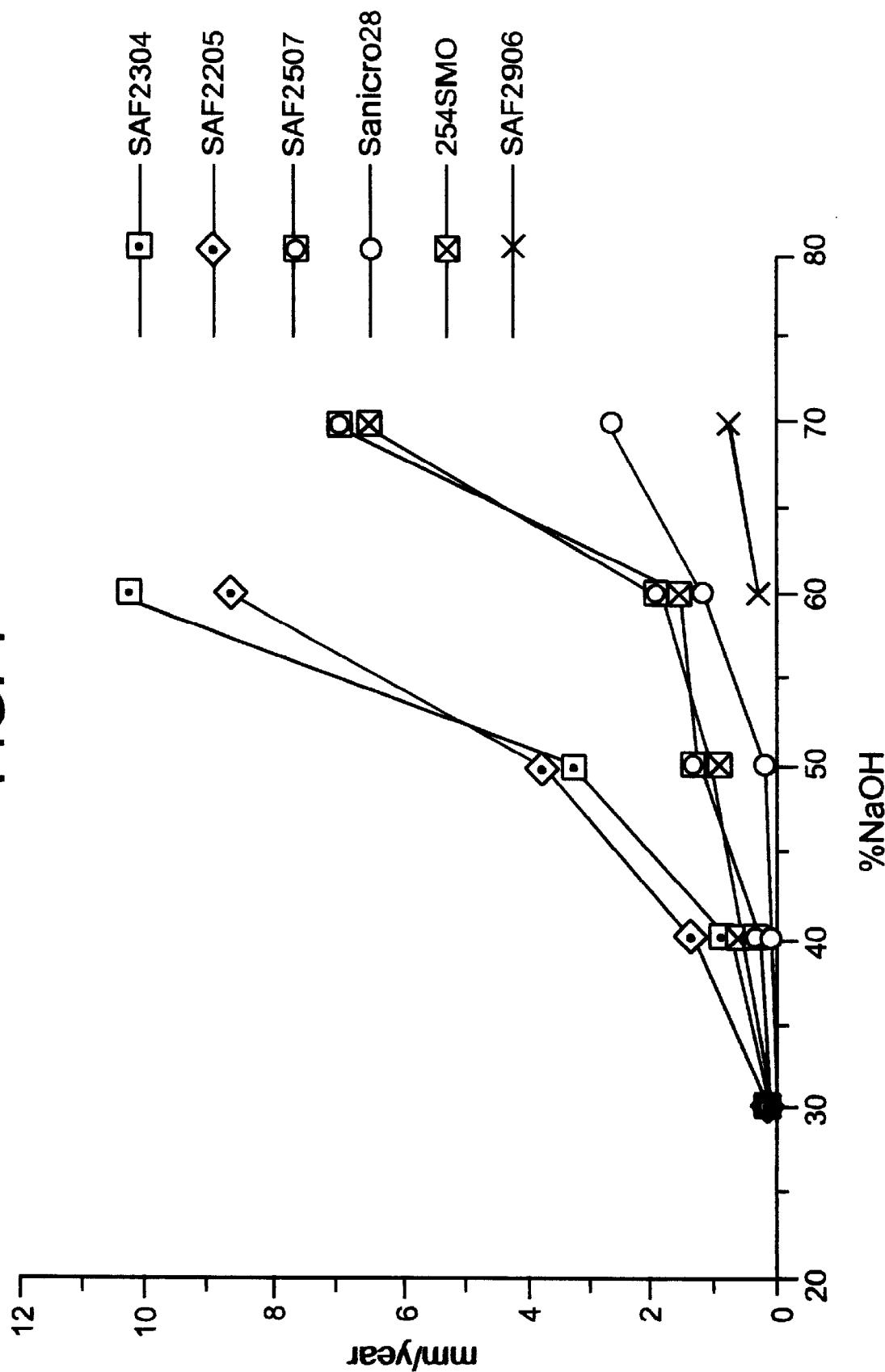

In order to determine the resistance and properties of ferritic-austenitic materials at exposure in different caustic soda environments a number of tests have been performed. In parallel with SAF 2906, a number of other commercial materials have been included.

The principal analysis of our new material SAF 2906 as well as of the other comparing materials are shown in Table 1 below.

TABLE 1

Chemical analysis, in weight-%, of the testing alloys

| Steel No | C | Si | Mn | Cr | Ni | Mo | N | Cu | Co |
|---|---|---|---|---|---|---|---|---|---|
| SAF 2906* | 0.02 | 0.3 | 1.0 | 29.0 | 6.7 | 2.2 | 0.37 | max 0.5 | |
| SAF 2205 | 0.02 | 0.5 | 0.85 | 22.1 | 5.6 | 3.1 | 0.17 | 0.5 | 0.5 |
| SAF 2304 | 0.03 | 0.5 | 1.0 | 22.5 | 4.8 | 0.3 | 0.1 | 0.5 | 0.5 |
| SAF 2507 | 0.02 | 0.4 | 0.6 | 25.4 | 6.8 | 3.8 | 0.3 | 0.5 | 0.5 |
| Sanicro 28 | 0.02 | 0.45 | 1.75 | 27 | 31 | 3.3 | 0.06 | 1.0 | |
| 254 SMO | 0.02 | 1.0 | 1.0 | 20 | 18 | 6.1 | 0.20 | 0.7 | |

*alloy according to the invention

The tests included corrosion testing in boiling NaOH at different concentrations. The result is illustrated in the Figure. The duplex stainless steels have a recognized good resistance to stress corrosion cracking. Environments with up to 50% NaOH are achieved at NaOH evaporation, where for instance the duplex steels SAF 2205, SAF 2304 and SAF 2507 show high corrosion rates. Sanicro 28 has a better resistance than these steel grades. The SAF 2906 alloy has been corrosion tested in boiling NaOH of different concentrations. It surprisingly shows that a very low corrosion rate is achieved with better resistance than of hitherto known duplex steels better achieved. It's results are also better than those of Sanicro 28.

In parallel with this, further testing of our new material SAF 2906 in solutions of NaOH/NaCl/NaClO$_3$ at two different concentrations has been done; one containing 10% NaOH and 2% NaCl, the other containing 50% NaOH and 7% NaCl. The solutions have contained 800 PPM ClO$_3$ in all cases. The results have been received as amount corroded material in mm/year, which is shown in Table 2 below.

TABLE 2

| Alloy | Environment | Temperature ° C. | Corrosion rate mm/year |
|---|---|---|---|
| SAF 2906 | 10% NaOH, 2% NaCl, 800 ppm ClO$_3$ | 100 | 0.001 |
| | | Boiling | 0.001 |
| | 50% NaOH, 7% NaCl, 800 ppm ClO$_3$ | 100 | 0.001 |
| | | Boiling | 0.016 |
| Sanicro 28 | 10% NaOH, 2% NaCl, 800 ppm ClO$_3$ | 100 | 0.001 |
| | | Boiling | 0.001 |
| | 50% NaOH, 7% NaCl, 800 ppm ClO$_3$ | 100 | 0.007 |
| | | Boiling | 0.34 |
| Ni 200 | 10% NaOH, 2% NaCl, 800 ppm ClO$_3$ | 100 | 0 |
| | | Boiling | 0.001 |
| | 50% NaOH, 7% NaCl, 800 ppm ClO$_3$ | 100 | 0.003 |
| | | Boiling | 0.15 |

It has surprisingly been shown, as can be seen from Table 2, that SAF 2906 is considerably better than the hitherto best materials Sanicro 28 and Ni 200. Austenitic-ferritic steels have in addition to that a recognized good resistance to erosion corrosion. The results accounted for show, as can be seen, the possibility of a substantial increase in length of life at selection of materials for NaOH evaporators. This increase in length of life is foreseen to be possible in the use of the material (SAF 2906) as tube, sheet, bar, welding material and casting.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An NaOH evaporator comprising at least one component formed, at least in part, by a ferritic-austenitic stainless steel alloy consisting essentially of, in weight %:

| | |
|---|---|
| C | max 0.05 |
| Si | max 0.8 |
| Mn | 0.3–4 |
| Cr | 28–35 |
| Ni | 3–10 |
| Mo | 1.0–4.0 |
| N | 0.2–0.6 |
| Cu | max 1.0 |
| W | max 2.0 |
| S | max 0.010 |
| Ce | max 0.2 | and the rest Fe with normally occurring impurities and additions and wherein the ferrite content is 30–70 volume %, with the balance austenite.

* * * * *